United States Patent
Dobberpuhl et al.

(10) Patent No.: US 6,718,458 B2
(45) Date of Patent: Apr. 6, 2004

(54) METHOD AND APPARATUS FOR PERFORMING ADDRESSING OPERATIONS IN A SUPERSCALAR, SUPERPIPELINED PROCESSOR

(75) Inventors: Dan Dobberpuhl, Menlo Park, CA (US); Robert Stepanian, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 10/401,170

(22) Filed: Mar. 27, 2003

(65) Prior Publication Data

US 2003/0191926 A1 Oct. 9, 2003

Related U.S. Application Data

(63) Continuation of application No. 09/481,481, filed on Jan. 11, 2000, now Pat. No. 6,578,135.

(51) Int. Cl.⁷ .............................. G06F 9/30; G06F 9/302; G06F 9/305; G06F 9/312; G06F 9/38
(52) U.S. Cl. .................. 712/219; 712/213; 712/245; 712/221; 712/206; 712/207; 712/225; 712/227; 712/23; 708/508
(58) Field of Search .................. 712/23, 219, 223, 712/245, 221, 212, 222, 215, 206, 207, 41, 213, 225, 227; 708/501, 505, 490, 508

(56) References Cited

U.S. PATENT DOCUMENTS

| 4,821,187 | A | | 4/1989 | Ueda et al. ............ 712/212 |
|---|---|---|---|---|
| 5,475,823 | A | * | 12/1995 | Amerson et al. ........ 711/169 |
| 6,115,730 | A | | 9/2000 | Dhablania et al. ........ 708/505 |
| 6,338,136 | B1 | | 1/2002 | Col et al. ............. 712/245 |
| 6,578,135 | B1 | | 6/2003 | Dobberpuhl et al. ..... 712/219 |

OTHER PUBLICATIONS

David A. Patterson and John L. Hennessy, "Computer Architecture A Quantitative Approach", Second Edition, Morgan Kaufman Publishers, Inc. San Francisco, CA, 1996, pp. 124–213 and 220–359.

* cited by examiner

Primary Examiner—Daniel H. Pan
(74) Attorney, Agent, or Firm—Lawrence J. Merkel

(57) ABSTRACT

A method and apparatus for improving the performance of a superscalar, superpipelined processor by identifying and processing instructions for performing addressing operations is provided. The invention heuristically determines instructions likely to perform addressing operations and assigns those instructions to specialized pipes in a pipeline structure. The invention can assign such instructions to both an execute pipe and a load/store pipe to avoid the occurrence of "bubbles" in the event execution of the instruction requires the calculation capability of the execute pipe. The invention can also examine a sequence of instructions to identify an instruction for performing a calculation where the result of the calculation is used by a succeeding load or store instruction. In this case, the invention controls the pipeline to assure the result of the calculation is available for the succeeding load or store instruction even if both instructions are being processed concurrently.

21 Claims, 5 Drawing Sheets

METHOD AND APPARATUS FOR PERFORMING ADDRESSING OPERATIONS IN A SUPERSCALAR, SUPERPIPELINED PROCESSOR

This application is a continuation of U.S. patent application Ser. No. 09/481,481 filed on Jan. 11, 2000 now U.S. Pat. No. 6,578,135.

TECHNICAL FIELD OF THE INVENTION

The invention relates generally to computer architectures and more specifically to the management of pipelining in a superscalar, superpipelined processor.

BACKGROUND OF THE INVENTION

Superscalar processors allow the execution of multiple instructions simultaneously. Historically, computer software has been generally programmed as a sequence of instructions, with each instruction to be executed before the one that succeeds it. However, if a processor executes the instructions serially, one instruction at a time, the performance of the processor is limited. Thus, superscalar processors provide performance improvements by executing several instructions at once.

A technique known as pipelining is used in superscalar processors to increase performance. Pipelining provides an "assembly line" approach to executing instructions. The execution of an instruction is divided into several steps. A superscalar processor is provided with a number of stages. Each stage performs a step in the execution of the instructions. Thus, while one step in the execution of one instruction is being performed by one stage of the processor, another step in the execution of another instruction may be performed by another stage of the processor. Since the execution of several instructions can be staggered across several stages, it is possible to begin a new instruction every clock cycle, even if the instructions require several clock cycles to be completed.

However, it is often necessary to know the result of one instruction before executing the instruction that succeeds it. If a pipelined superscalar processor attempts to execute an instruction for which antecedent instructions have not yet been fully executed, the pipeline may be forced to stop and wait until all antecedent conditions for the execution of the instruction have been met.

Superpipelining refers to pipelining using pipes with more than five stages. Superpipelining extends the benefits of pipelining, but increases the potential for delays caused by dependencies between instructions. Thus, a pipe may be forced to stop and wait several clock cycles in order to satisfy a dependency based on an instruction being processed in another pipe.

While a pipeline structure may be optimized for certain conditions, it is extremely difficult to optimize performance for all possible sequences of instructions. Thus, a technique is needed that improves pipeline performance beyond the level that can be achieved by changes to the pipeline structure.

DETAILED DESCRIPTION OF A PREFERRED EMBODIMENT

A method and apparatus for improving the performance of a superscalar, superpipelined processor by identifying and processing instructions for performing addressing operations is provided. The invention heuristically determines instructions likely to perform addressing operations and assigns instructions to specialized pipes in a pipeline structure based on this determination. The invention can assign such instructions to either an execute pipe or a load/store pipe, or to both an execute pipe and a load/store pipe, to improve performance. By assigning the instructions to both an execute pipe and a load/store pipe, an address to be used by a subsequent instruction can be calculated by the load/store pipe before the execute pipe has completed calculation of the address, thereby reducing delay in the execution of the subsequent instruction and improving performance. The invention can also examine a sequence of instructions to identify an instruction for performing a calculation where the result of the calculation is used by a succeeding load or store instruction. In this case, the invention controls the pipeline to assure the result of the calculation is available for the succeeding load or store instruction.

A load/store (load or store) instruction may be referred to as a transfer instruction. Likewise, a load/store pipe may be referred to as a transfer pipe.

Figure 1:
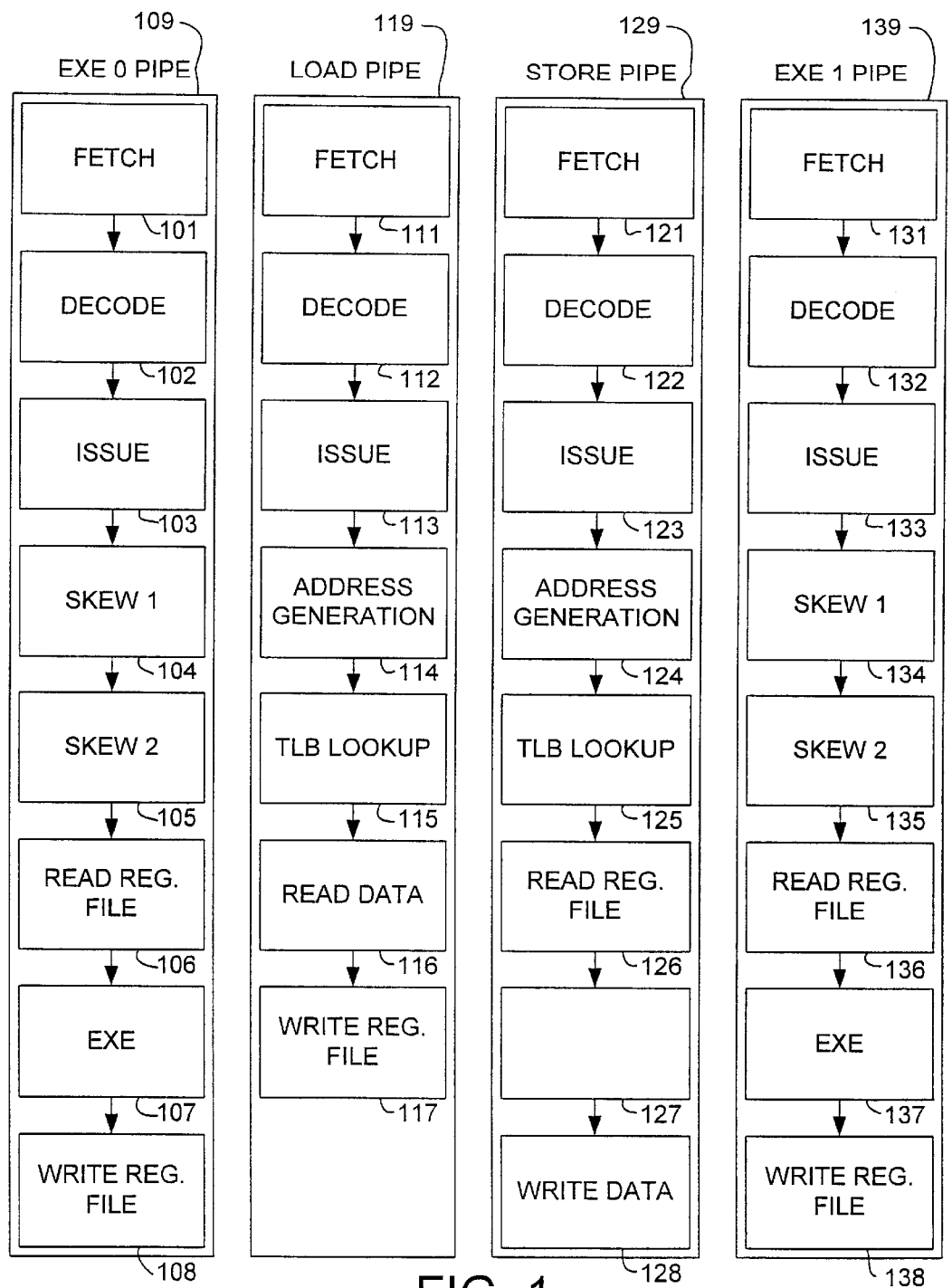
FIG. 1 is a block diagram illustrating a plurality of pipes according to an embodiment of the invention.

FIG. 1 is a block diagram illustrating a plurality of pipes according to an embodiment of the invention. The plurality of pipes includes execute 0 pipe 109, load pipe 119, store pipe 129, and execute 1 pipe 139. Execute 0 pipe 109, which is an example of an execute pipe, includes fetch stage 101, decode stage 102, issue stage 103, skew 1 stage 104, skew 2 stage 105, read register file stage 106, execute stage 107, and write register file stage 108. At fetch stage 101, an instruction is fetched from memory. At decode stage 102, the instruction is decoded to determine the operation that is to be performed by the processor.

At issue stage 103, the instruction is issued to a pipe for processing. For example, an instruction fetched in fetch stage 101 and decoded in decode stage 102 may be issued in issue stage 103 to any of execute 0 pipe 109, load pipe 119, store pipe 129, or execute 1 pipe 139. Since the instruction would already be fetched and decoded, the instruction could be issued to skew 1 stage 104, address generation stage 114, address generation stage 124, or skew 1 stage 134.

Assuming the instruction were issued to execute 0 pipe 109, the instruction would be processed according to the remaining stages of execute 0 pipe 109. At skew 1 stage 104, a delay of one clock cycle is provided to maintain synchronization with load pipe 119 and store pipe 129, thereby avoiding a "bubble" condition for certain sequences of instructions. A "bubble" condition occurs when, as a result of a dependency between instructions being processed by different pipes of the pipeline structure, information needed for the processing of an instruction in one pipe has not yet been made available by another pipe. Steps that do not perform any actual operation, referred to as "no operation"

steps, or simply NOP's, are inserted in the pipe to delay the processing until the dependency can be accommodated. At skew 2 stage 105, another delay of one clock cycle is provided.

At read register file stage 106, any register files required to be read as operands of the instruction are read. At execute stage 107, the operation indicated by the instruction is performed, thereby generating a result. At write register file stage 108, the result is written to the appropriate register file, for example, as indicated by the instruction.

Load pipe 119, which is an example of a load/store pipe, includes fetch stage 111, decode stage 112, issue stage 113, address generation stage 114, translation lookaside buffer lookup stage 115, read data stage 116, write register file stage 117, and null stage 118. Fetch stage 111, decode stage 112, and issue stage 113 are essentially identical to fetch stage 101, decode stage 102, and issue stage 103. In address generation stage 114, a virtual address is generated based on operands provided with the instruction. In translation lookaside buffer lookup stage 115, a translation lookaside buffer lookup is performed to determine a physical address based on the virtual address. In read data stage 116, data are read from a cache memory at a location specified by the physical address. In write register file stage 117, the data are written to a register file, as specified by the operands of the instruction.

Store pipe 129, which is an example of a type of load/store pipe, includes fetch stage 121, decode stage 122, issue stage 123, address generation stage 124, translation lookaside buffer stage 125, read register file stage 126, null stage 127, and write data stage 128. Fetch stage 121, decode stage 122, and issue stage 123 are essentially identical to fetch stage 101, decode stage 102, and issue stage 103. In address generation stage 124, a virtual address is generated based on operands provided with the instruction. In translation lookaside buffer lookup stage 115, a translation lookaside buffer lookup is performed to determine a physical address based on the virtual address. In read register file stage 126, data are read from a register file, as specified by the operands of the instruction. In null stage 127, no action need be taken. Null stage 127 may be used to provide a delay to maintain synchronization among the pipes, or it may be omitted. In write data stage 128, the data are written to a cache memory at a location specified by the physical address.

Execute 1 pipe 139, which is an example of an execute pipe, includes fetch stage 131, decode stage 132, issue stage 133, skew 1 stage 134, skew 2 stage 135, read register file stage 136, execute stage 137, and write register file stage 138. Fetch stage 131, decode stage 132, and issue state 133 are essentially identical to fetch stage 101, decode stage 102, and issue stage 103. In skew stage 134, a delay of one clock cycle is provided to maintain synchronization with load pipe 119 and store pipe 129, thereby avoiding a "bubble" condition for certain sequences of instructions. In skew 2 stage 135, another delay of one clock cycle is provided.

At read register file stage 136, any register files required to be read as operands of the instruction are read. At execute stage 137, the operation indicated by the instruction is performed, thereby generating a result. At write register file stage 138, the result is written to the appropriate register file, for example, as indicated by the instruction.

By providing skew 1 stage 104 and skew 2 stage 105 in Execute 0 pipe 109 and skew 1 stage 134 and skew 2 stage 135 in Execute 1 pipe 139, certain sequences of instructions that are interdependent may be co-issued without requiring a pipe to stop processing to accommodate the dependencies.

For example, if a load or store instruction is followed by an execute instruction that uses the value loaded or stored according to the load or store instruction, both the load or store instruction and the execute instruction that follows it can be issued at the same time to different pipes of the pipeline structure. By issuing the load or store instruction to a load/store pipe and issuing the execute instruction to an execute pipe, the skew stages in the execute pipes stagger the execute pipes relative to the load/store pipes so that the value loaded or stored is ready in time for it to be used in an execute pipe without causing the execute pipe to stop.

However, while the introduction of skew stages improves performance of a superscalar, superpipelined processor when executing a load or store instruction followed by an execute instruction that uses the value loaded or stored according to the load or store instruction, it complicates execution of other sequences of instructions. For example, when an execute instruction is followed by a load or store instruction, where an address used by the load or store instruction is calculated by the execute instruction, not only does a delay normally occur while the execute instruction is processed before the load or store instruction can be processed, but the delay is increased by the skew stages. This delay detrimentally affects performance.

An embodiment of the invention avoids the delay described above by enabling a load or store pipe to calculate the address used by the load or store instruction before the processing of the execute instruction is completed in the execute pipe. Thus, processing of the load or store instruction can be completed without waiting for processing of the execute instruction to be completed. Thus, the invention avoids the delay of described previously.

Figure 2:
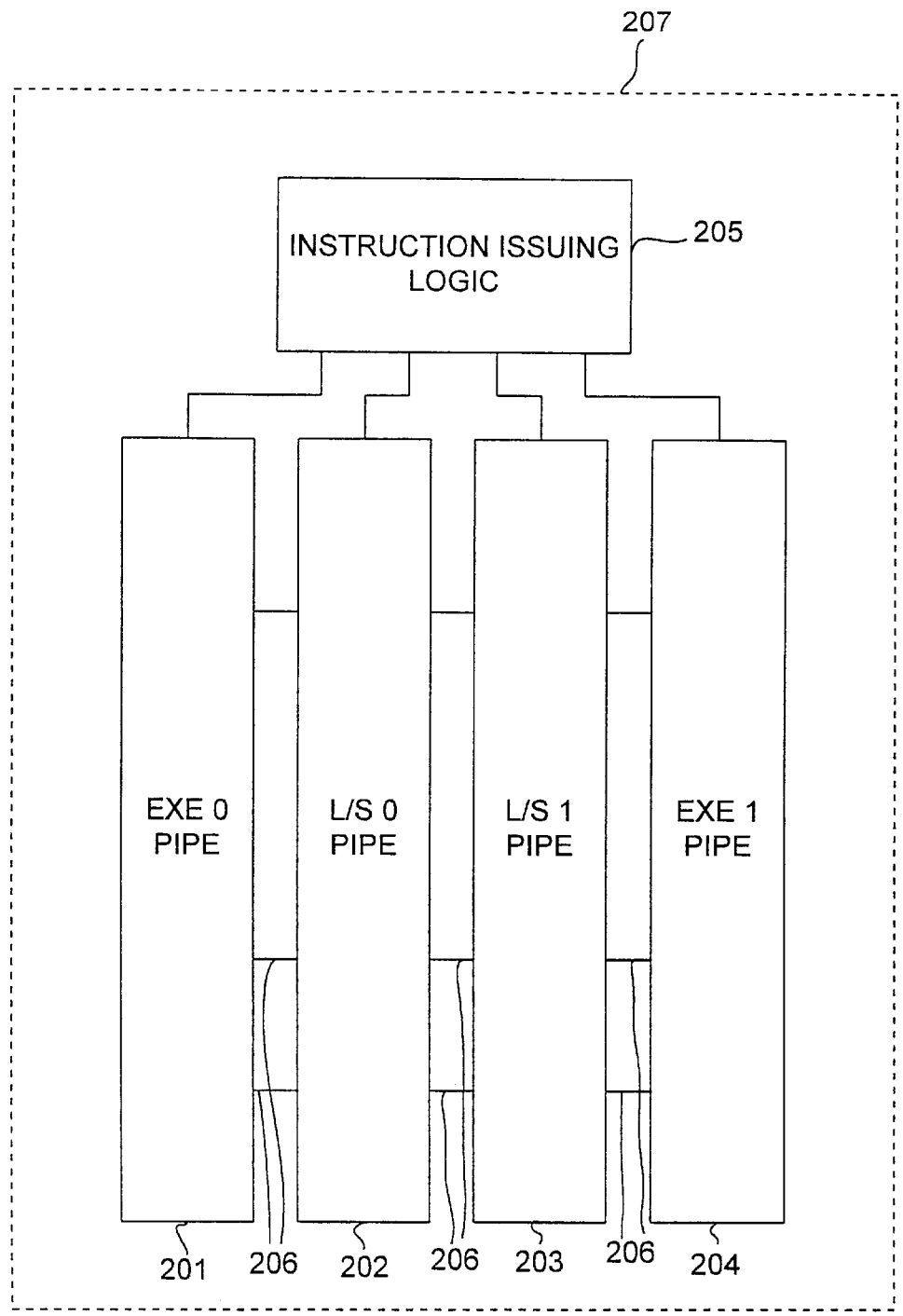
FIG. 2 is a block diagram illustrating instruction issuing logic in relation to a plurality of pipes according to the invention.

FIG. 2 is a block diagram illustrating instruction issuing logic in relation to a plurality of pipes according to the invention. Instruction issuing logic 205 is illustrated in relation to execute 0 pipe 201, load/store 0 pipe 202, load/store 1 pipe 203, and execute 1 pipe 204. Instruction issuing logic 205, execute 0 pipe 201, load/store 0 pipe 202, load/store 1 pipe 203, and execute 1 pipe 204 are included within superscalar, superpipelined processor 207. Instruction issuing logic 205 is operatively coupled to execute 0 pipe 201, load/store 0 pipe 202, load/store 1 pipe 203, and execute 1 pipe 204. Execute 0 pipe 201, load/store 0 pipe 202, load/store 1 pipe 203, and execute 1 pipe 204 may also be operatively coupled to each other, as indicated by connections 206. The instruction issuing logic 205 issues to a load/store pipe, such as load/store 0 pipe 202 or load/store 1 pipe 203, an instruction likely to perform an addressing operation. Other instructions, such as instructions for operations requiring execution are issued to an execute pipe, such as execute 0 pipe 201 or execute 1 pipe 204.

The instruction issuing logic 205 heuristically determines the instruction as being likely to perform the addressing operation. For example, the instruction issuing logic 205 can compare the type of instruction being issued against known types of instructions associated with addressing operations. The instruction issuing logic 205 can also look at the next instruction to be processed to see if the combination of the current instruction and the next instruction are a combination known to be associated with addressing operations. Addressing operations include operations that relate to an address, such as operations that involve loading or storing a value at a particular location in a memory device according to an address for that particular location.

As an example, the instruction issuing logic 205 can identify the instruction as being a short shift instruction. For example, the short shift instruction may cause a shift of two or three bits. Such a shift may be interpreted as being associated with an addressing operation. As such, the instruction may be issued to a load/store pipe.

As another example, the instruction issuing logic 205 can determine that the instruction is a literal instruction. A literal instruction may be an immediate mode instruction or an instruction with values embedded in the instruction. Thus, it is not necessary to refer to a two register locations to obtain those values. Such instructions may be interpreted as being associated with an addressing operation. As such, the instruction may be issued to a load/store pipe.

As yet another example, the instruction issuing logic 205 can determine that the instruction is one of the following: an add immediate unsigned instruction, a dual add immediate unsigned instruction, a subtract immediate unsigned instruction, a dual subtract immediate unsigned instruction, a load upper immediate instruction, and an OR immediate instruction.

While the instruction issuing logic 205 can issue an instruction identified as being an instruction likely to perform an addressing operation to a load/store pipe, the instruction issuing logic 205 can also issue such an instruction to both an execute pipe and a load/store pipe. In that case, before the execute pipe finishes calculating a result, the load/store pipe calculates an address and provides the address for use in a subsequent instruction. The instruction issuing logic 205 can issue the instruction to both the load/store pipe and the execute pipe during an identical clock cycle so as to maintain synchronization between the load/store pipe and the execute pipe, or the instruction issuing logic 205 can issue the instruction to the load/store pipe and the execute pipe during different clock cycles.

Figure 3:
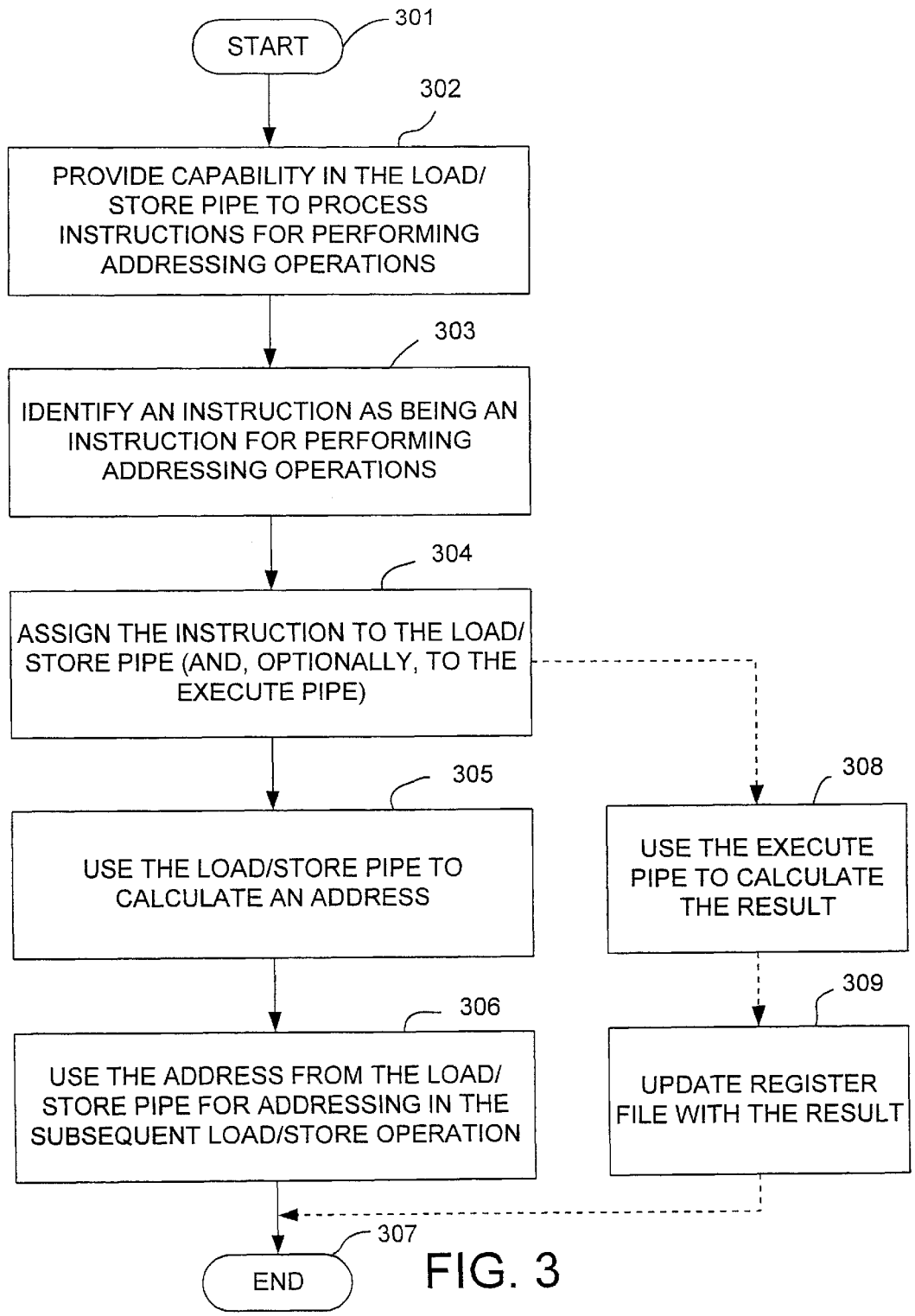
FIG. 3 is a flow diagram illustrating a method according to an embodiment of the invention.

FIG. 3 is a flow diagram illustrating a method according to an embodiment of the invention. The method allows processing an instruction in a superscalar, superpipelined processor that includes a load/store pipe and an execute pipe. The method begins in step 301. In step 302, a capability in the load/store pipe to process instructions for performing addressing operations is provided. In step 303, an instruction is identified as being among the instructions for performing addressing operations. This identification may be performed by heuristically determining that the instruction is likely to perform an addressing operation. In step 304, the instruction is assigned to a load/store pipe. Optionally, the instruction may be assigned to both the load/store pipe and the execute pipe. If the instruction is assigned to both the load/store pipe and the execute pipe, the instruction may be assigned to both pipes during the same clock cycle or during different clock cycles. In step 305, the load/store pipe is used to calculate an address. In step 306, the address calculated by the load/store pipe is used for addressing in a load or store instruction that follows the instruction that led to the calculation of the address in step 305. If the instruction is assigned to the execute pipe, as well as to the load/store pipe, the process uses the execute pipe to calculate a result in step 308. In step 309, the process updates a register file with the result calculated in step 308. Since the execute pipe is usually longer than the load/store pipe, steps 308 and 309 usually require more time to complete than steps 305 and 306. Thus, the process uses a load/store pipe to provide an address for use in a subsequent load or store operation before the result is available from the execute pipe. In step 307, the process ends.

Figure 4:
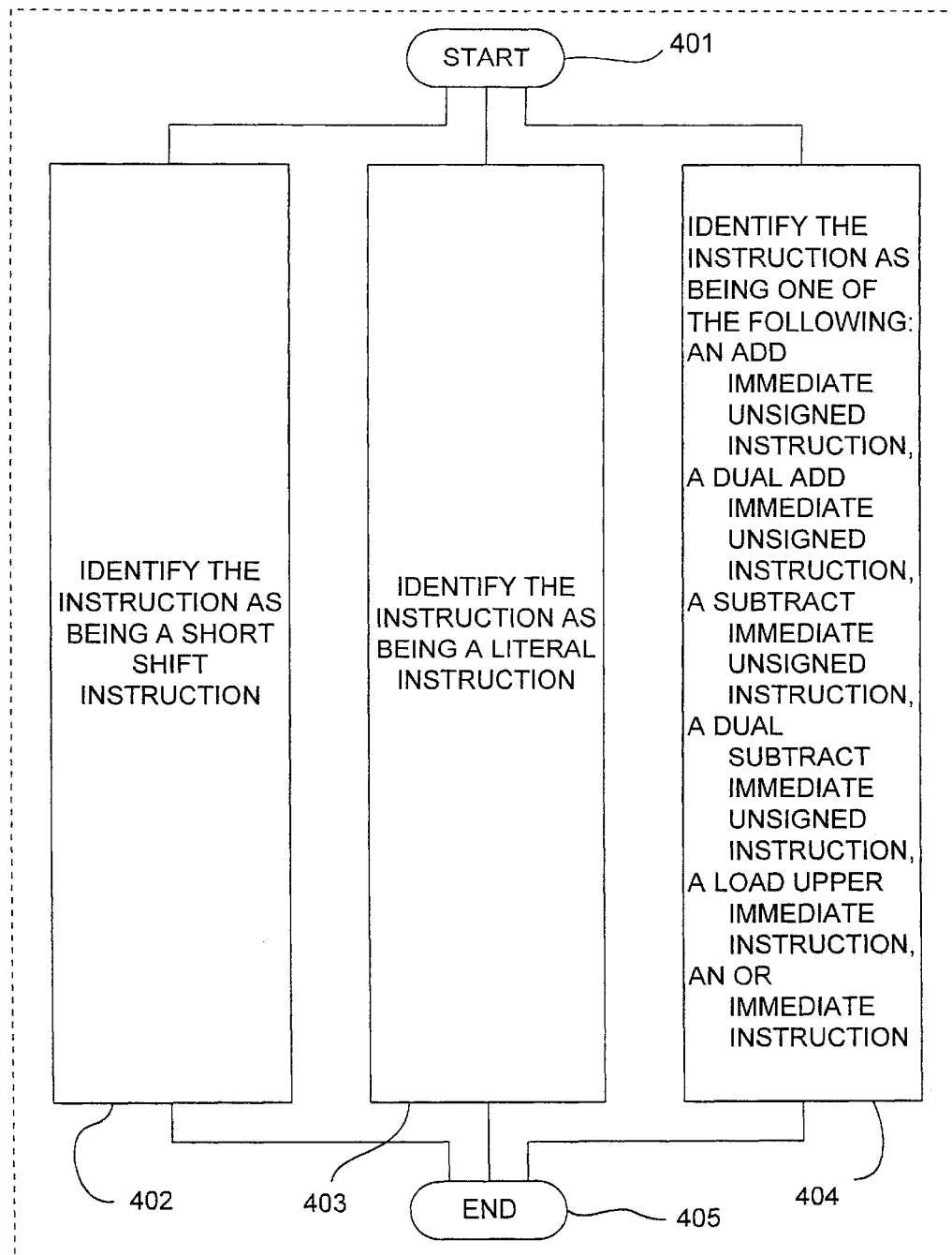
FIG. 4 is a flow diagram illustrating a method for identifying an instruction as being an instruction for performing addressing operations according to an embodiment of the invention.

FIG. 4 is a flow diagram illustrating a method for identifying an instruction as being an instruction for performing addressing operations according to an embodiment of the invention. The method begins in step 401. The method then identifies the instruction according to one or more of steps 402, 403, and 404. In step 402, a determination is made as to whether the instruction is a short shift instruction. For example, the instruction may be identified as a short shift instruction that results in shifting by two bits or four bits. In step 403, a determination is made as to whether the instruction is a literal instruction. In step 404, a determination is made as to whether the instruction is one of the following: an add immediate unsigned (ADD i/u) instruction, a dual add immediate unsigned (DADD i/u) instruction, a subtract immediate unsigned (SUB i/u) instruction, a dual subtract immediate unsigned (DSUB i/u) instruction, a load upper immediate (LUI) instruction, or an OR immediate (ORI) instruction. The method ends in step 405. The steps of this method, as denoted by region 406, may be used to implement step 303 of the process of FIG. 3. Some or all of steps 402, 403, and 404 may be combined to allow testing for short shift instructions, literal instructions, ADD i/u, DADD i/u, SUB i/u, DSUB i/u, LUI, or ORI instructions, or any combination thereof.

In one embodiment of the invention, if an instruction such as an ADD i/u, DADD i/u, SUB i/u, DSUB i/u, LUI, or ORI is followed by a consuming load or store instruction, an execute pipe and two load/store pipes can be used to improve performance. A consuming load or store instruction is a load or store instruction that relies on the result of the ADD i/u, DADD i/u, SUB i/u, DSUB i/u, LUI, or ORI instruction. In the event that a consuming load or store instruction follows one of these instructions, one load/store pipe is used to perform the actual load or store instruction, while the other load/store pipe is used to calculate the operands of the load/store instruction, including any calculation to be performed by the ADD i/u, DADD i/u, SUB i/u, DSUB i/u, LUI, or ORI instruction upon which the operands of the load/store instruction depend.

The execute pipe is used to perform the calculation of the ADD i/u, DADD i/u, SUB i/u, DSUB i/u, LUI, or ORI instruction and to update any register that is changed as a result of the ADD i/u, DADD i/u, SUB i/u, DSUB i/u, LUI, or ORI instruction. Since the load/store pipes can be shorter than the execute pipe, the load/store pipes can provide the calculations of the ADD i/u, DADD i/u, SUB i/u, DSUB i/u, LUI, or ORI instruction for use in the load or store operation before the processing of the ADD i/u, DADD i/u, SUB i/u, DSUB i/u, LUI, or ORI instruction by the execute pipe is completed. Any other non-addressing operations that require the results of the ADD i/u, DADD i/u, SUB i/u, DSUB i/u, LUI, or ORI instruction can obtain those results after processing of the instruction is completed by the execute pipe.

If the ADD i/u, DADD i/u, SUB i/u, DSUB i/u, LUI, or ORI instruction is not followed by a consuming load or store instruction, the action taken depends on the state of the load/store pipe and the execute pipe. If the load/store pipe is busy and the execute pipe is busy, no action is taken until either pipe is no longer busy. If the load/store pipe is busy, but the execute pipe is ready, execution of the instruction proceeds in the execute pipe.

If the load/store pipe is ready, but the execute pipe is busy, the instruction is processed using the load/store pipe if all the operands are ready. If not all operands are ready, no action is taken until the situation changes. If both the load/store pipe and the execute pipe are ready, the instruction is processed using the load/store pipe if all the operands are ready. If not all operands are ready, the instruction is processed using the execute pipe.

In an embodiment of the invention, the above actions occur regardless of whether or not the ADD i/u, DADD i/u, SUB i/u, DSUB i/u, LUI, or ORI instruction is followed by a consuming load or store instruction. By not having to analyze any instructions following the ADD i/u, DADD i/u, SUB i/u, DSUB i/u, LUI, or ORI instruction, unnecessary complexity is avoided.

Figure 5:
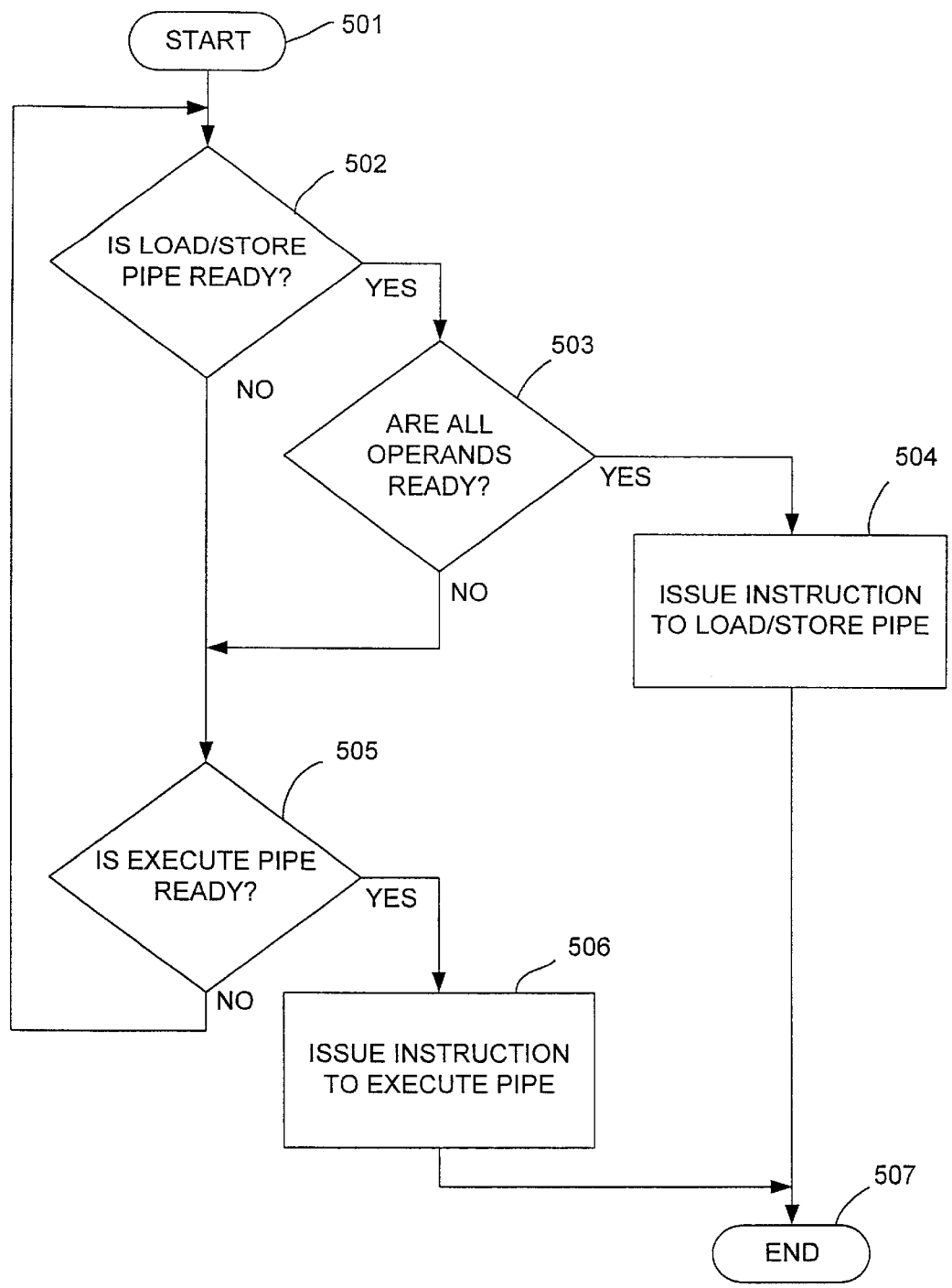
FIG. 5 is a flow diagram illustrating a process according to an embodiment of the invention.

FIG. 5 is a flow diagram illustrating a process according to an embodiment of the invention. The process begins in step 501. In step 502, a decision is made as to whether or not the load/store pipe is ready. If the load/store pipe is ready, the process continues to step 503. In step 503, a decision is made as to whether or not all operands are ready. If so, the instruction is issued to the load/store pipe in step 504. The process then ends in step 507.

If the load/store pipe is not ready in step 502 or not all operands are ready in step 503, the process continues to step 505. In step 505, a decision is made as to whether or not the execute pipe is ready. If the execute pipe is not ready, the process returns to step 502. If the execute pipe is ready, the process continues to step 506. In step 506, the instruction is issued to the execute pipe. The process then ends in step 507.

It is understood that the load/store pipe and the execute pipe referenced with respect to FIG. 5 may be practiced with multiple load/store pipes and/or multiple execute pipes. An instruction may be issued to any suitable load/store pipe and/or execute pipe that is ready, provided the conditions of FIG. 5 are met.

Thus, a method and apparatus for improving the performance of a superscalar, superpipelined processor by identifying and processing instructions for performing addressing operations has been provided.

What is claimed is:

1. A processor comprising:
    an execute pipe;
    a load/store pipe; and
    a circuit coupled to the execute pipe and the load/store pipe to issue instructions to the execute pipe and to issue instructions to the load/store pipe, wherein the circuit is configured to issue an execute instruction to the load/store pipe for execution responsive to the execute instruction being likely to perform an addressing operation, wherein the execute instruction excludes a load or store operation.

2. The processor as recited in claim 1 wherein the circuit is configured to issue the execute instruction to the execute pipe responsive to the execute instruction being not likely to perform the addressing operation.

3. The processor as recited in claim 1 wherein the execute instruction, in at least some cases, does not perform the addressing operation.

4. The processor as recited in claim 1 wherein the circuit is configured to heuristically determine whether or not the execute instruction is likely to perform the addressing operation.

5. The processor as recited in claim 1 wherein the circuit is configured to determine that the execute instruction is likely to perform the addressing operation if the execute instruction is a short shift instruction.

6. The processor as recited in claim 5 wherein the short shift instruction results in shifting by two or three bits.

7. The processor as recited in claim 1 wherein the circuit is configured to determine that the execute instruction is likely to perform the addressing operation if the execute instruction is a literal instruction.

8. The processor as recited in claim 1 wherein the circuit is configured to determine that the execute instruction is likely to perform the addressing operation if the execute instruction is an unsigned arithmetic/logic instruction having an immediate operand.

9. The processor as recited in claim 8 wherein the execute instruction is one of an add immediate unsigned instruction; a dual add immediate unsigned instruction; a subtract immediate unsigned instruction; a dual subtract immediate unsigned instruction; a load upper immediate instruction; and an OR immediate instruction.

10. The processor as recited in claim 1 wherein the circuit is configured to also issue the execute instruction to the execute pipe.

11. The processor as recited in claim 1 further comprising a second load/store pipe, wherein the circuit is configured to issue a load/store instruction that consumes a result of the execute instruction to the second load/store pipe.

12. A method comprising:
    issuing an execute instruction to a load/store pipe in a processor for execution responsive to the execute instruction being likely to perform an addressing operation, wherein the execute instruction excludes a load or store operation; and
    issuing the execute instruction to an execute pipe in the processor responsive to the execute instruction being not likely to perform the addressing operation.

13. The method as recited in claim 12 wherein the execute instruction, in at least some cases, does not perform the addressing operation.

14. The method as recited in claim 12 further comprising heuristically determining whether or not the execute instruction is likely to perform the addressing operation.

15. The method as recited in claim 12 further comprising determining that the execute instruction is likely to perform the addressing operation if the execute instruction is a short shift instruction.

16. The method as recited in claim 15 wherein the short shift instruction results in shifting by two or three bits.

17. The method as recited in claim 12 further comprising determining that the execute instruction is likely to perform the addressing operation if the execute instruction is a literal instruction.

18. The method as recited in claim 12 further comprising determining that the execute instruction is likely to perform the addressing operation if the execute instruction is an unsigned arithmetic/logic instruction having an immediate operand.

19. The method as recited in claim 18 wherein the execute instruction is one of an add immediate unsigned instruction; a dual add immediate unsigned instruction; a subtract immediate unsigned instruction; a dual subtract immediate unsigned instruction; a load upper immediate instruction; and an OR immediate instruction.

20. The method as recited in claim 12 further comprising also issuing the execute instruction to the execute pipe.

21. The method as recited in claim 12 further comprising issuing a load/store instruction that consumes a result of the execute instruction to a second load/store pipe in the processor.

* * * * *